US012580468B2

(12) United States Patent
     Belet

(10) Patent No.: US 12,580,468 B2
(45) Date of Patent: Mar. 17, 2026

(54) INTEGRATED CIRCUIT COMPRISING A VOLTAGE REGULATOR AND CORRESPONDING REGULATION METHOD

(71) Applicant: STMicroelectronics (Grand Ouest) SAS, Le Mans (FR)

(72) Inventor: Christophe Belet, Parigné l'évêque (FR)

(73) Assignee: STMicroelectronics (Grand Ouest) SAS, Le Mans (FR)

( * ) Notice: Subject to any disclaimer, the term of this patent is extended or adjusted under 35 U.S.C. 154(b) by 236 days.

(21) Appl. No.: 18/490,289

(22) Filed: Oct. 19, 2023

(65) Prior Publication Data

US 2025/0132655 A1     Apr. 24, 2025

(30) Foreign Application Priority Data

Oct. 21, 2022    (FR) ...................................... 2210961

(51) Int. Cl.
     *H02M 1/00*     (2007.01)
     *H02M 1/08*     (2006.01)
     *H02M 3/156*    (2006.01)
(52) U.S. Cl.
     CPC ....... *H02M 1/0003* (2021.05); *H02M 1/0045* (2021.05); *H02M 1/08* (2013.01); *H02M 3/156* (2013.01)
(58) Field of Classification Search
     CPC .... H02M 1/0003; H02M 1/0045; H02M 1/08; H02M 3/156; H02M 1/0025
     See application file for complete search history.

(56) References Cited

U.S. PATENT DOCUMENTS

| | | | | |
|---|---|---|---|---|
| 6,031,362 | A | 2/2000 | Bradley | |
| 6,441,591 | B2 | 8/2002 | Nokkonen | |
| 8,866,460 | B2 * | 10/2014 | Huang | H02M 3/158 |
| | | | | 323/283 |
| 10,855,185 | B2 * | 12/2020 | Song | G05F 1/56 |
| 2010/0060078 | A1 * | 3/2010 | Shaw | H02M 1/36 |
| | | | | 307/31 |
| 2016/0179181 | A1 * | 6/2016 | Doyle | G06F 1/3287 |
| | | | | 713/323 |
| 2020/0083810 | A1 | 3/2020 | Song et al. | |

FOREIGN PATENT DOCUMENTS

| | | |
|---|---|---|
| CN | 104092375 A | 10/2014 |
| CN | 107425719 B | 12/2020 |

OTHER PUBLICATIONS

Shylaja, Avinash Dinesh, et al., "High-PSR LDOs: Variations, Improvements, and Best Compromise," IEEE Transactions on Circuits and Systems-II: Express Briefs, vol. 69, No. 3, Mar. 2022, 5 pages.

* cited by examiner

*Primary Examiner* — Kyle J Moody
(74) *Attorney, Agent, or Firm* — Slater Matsil, LLP

(57)     ABSTRACT

A voltage regulator includes a pre-regulation circuit and a low drop-out voltage regulator. The pre-regulation circuit is configured to generate a first power supply voltage based on an input voltage. The low drop-out voltage regulator is configured to generate a second power supply voltage based on the first power supply voltage. Additionally, the low drop-out voltage regulator is configured to filter a low-frequency component of the first power supply voltage.

20 Claims, 2 Drawing Sheets

[Fig 1]
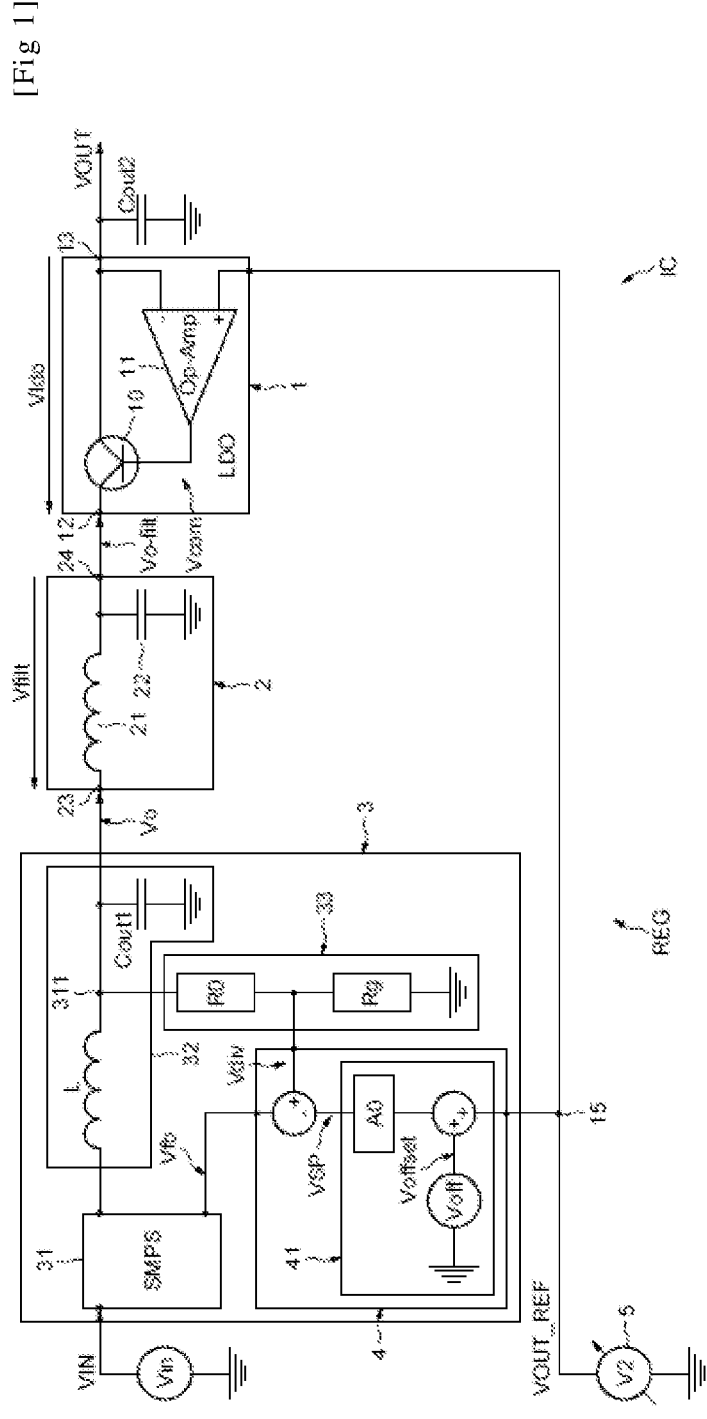

[Fig 2]

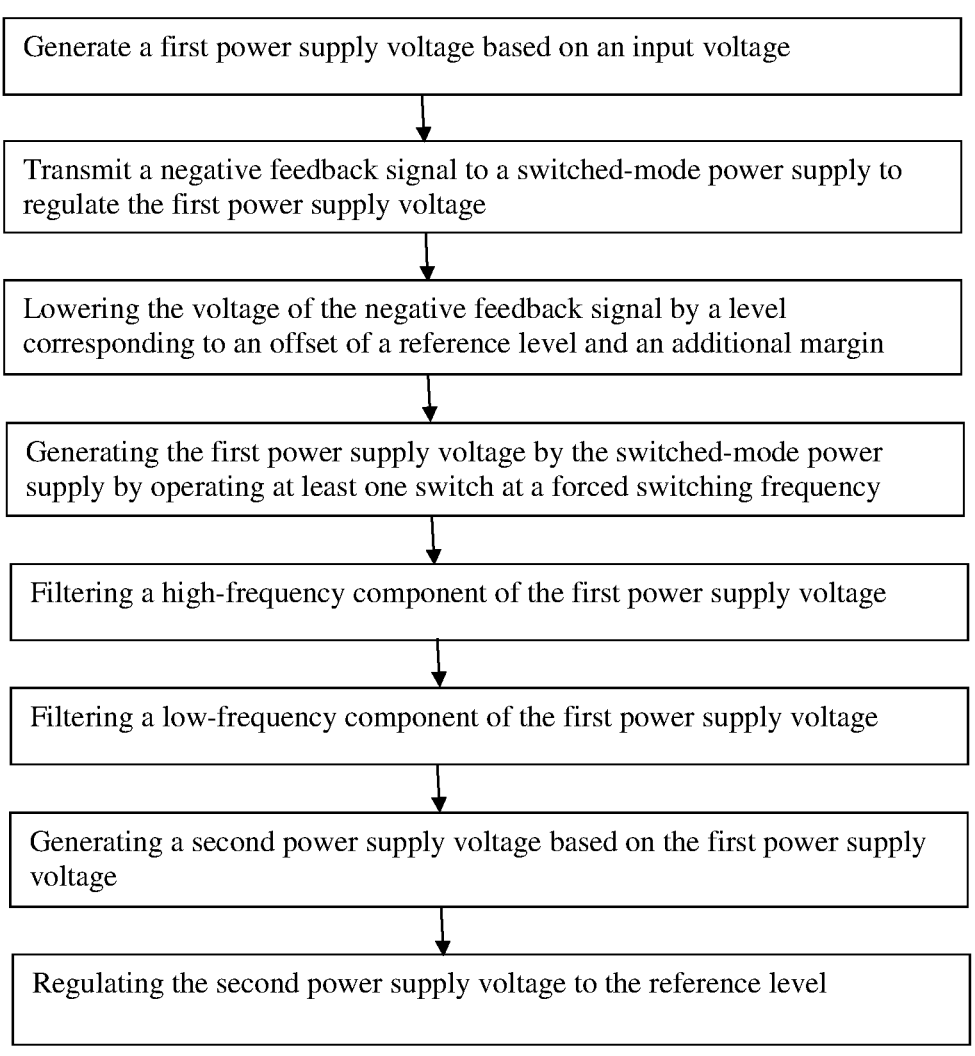

Generate a first power supply voltage based on an input voltage

Transmit a negative feedback signal to a switched-mode power supply to regulate the first power supply voltage Lowering the voltage of the negative feedback signal by a level corresponding to an offset of a reference level and an additional margin Generating the first power supply voltage by the switched-mode power supply by operating at least one switch at a forced switching frequency Filtering a high-frequency component of the first power supply voltage Filtering a low-frequency component of the first power supply voltage Generating a second power supply voltage based on the first power supply voltage Regulating the second power supply voltage to the reference level

INTEGRATED CIRCUIT COMPRISING A VOLTAGE REGULATOR AND CORRESPONDING REGULATION METHOD

CROSS-REFERENCE TO RELATED APPLICATIONS

This application claims the benefit of French patent application number FR 2210961, filed on Oct. 21, 2022, which application is hereby incorporated herein by reference.

TECHNICAL FIELD

The present disclosure relates generally to power supply voltage regulation circuits, and particular embodiments relate to very low noise voltage regulators.

BACKGROUND

Linear voltage regulators are simple circuits typically used in electronics to power supply devices with a continuous, constant, regulated output voltage.

Linear voltage regulators operate as DC to DC step-down voltage converters, which means that the input voltage is always greater than the output voltage. Typically, energy is transferred from input to output by a power transistor and the output voltage is regulated by a feedback loop biased by a reference voltage controlling the power transistor via an operational amplifier.

Linear regulators are conventionally used to power supply sensitive peripherals requiring a very low noise power supply source, for example in comparison to a switched-mode power supply voltage regulator typically having non-negligible switching noise.

However, a key disadvantage of linear regulators is that they have inefficiency when it comes to power loss, the power loss being proportional to the ratio of input voltage to output voltage.

For example, when power supplied by a 5 V (Volts) power supply source power supplying a 1 V peripheral load where the current draw of the peripheral is approximately 1 A (Ampere), the peripheral draws 1 W (Watt) (1V×1 A) and the linear regulator loses 4 W ((5V−1V)×1 A). This conventional example generates a thermal heating of substantially 4 W by Joule effect, and requires a macroscopic cooling system (radiator, fan, etc.), which is very disadvantageous.

SUMMARY

In various embodiments, the present disclosure provides circuits and methods which at least partially address a need or desire to improve energy efficiency while keeping the advantage of a linear voltage regulator for very low noise regulation.

In at least one embodiment, a voltage regulator is provided that includes a pre-regulation circuit and a low drop-out voltage regulator. The pre-regulation circuit is configured to generate a first power supply voltage based on an input voltage. The low drop-out voltage regulator is configured to generate a second power supply voltage based on the first power supply voltage, and to filter a low-frequency component of the first power supply voltage.

In at least one embodiment, an integrated circuit is provided that includes a voltage regulator. The voltage regulator includes a pre-regulation circuit and a low drop-out voltage regulator. The pre-regulation circuit is configured to receive an input voltage and to generate a first power supply voltage based on the input voltage. The low drop-out voltage regulator is configured to generate a second power supply voltage by filtering a low-frequency component of the first power supply voltage.

In at least one embodiment, a method is provided that includes: generating, by a pre-regulation circuit, a first power supply voltage based on an input voltage received from a voltage source; and generating, by a low drop-out regulator, a second power supply voltage, based on the first power supply voltage, by filtering a low-frequency component of the first power supply voltage.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates a voltage regulator, in accordance with one or more embodiments; and FIG. 2 is a block diagram illustrating a method for regulating a voltage by a voltage regulator, in accordance with one or more embodiments.

DETAILED DESCRIPTION OF ILLUSTRATIVE EMBODIMENTS

Conventional solutions for pre-regulating a linear regulator with a switched-mode power supply have been proposed. Conventional solutions are not satisfactory when it comes to ultra-low noise voltage regulation, or even when it comes to optimising energy efficiency.

Embodiments and implementations defined below allow to reduce, or even cancel, the noise of a switched-mode power supply providing a pre-regulation voltage to a linear regulator, so as to maintain a very low output noise; and allow to optimise the energy efficiency of the regulator, in particular by automatically maintaining the operation of the linear regulator very close to its "drop-out voltage" (designating the minimum voltage of input for the operation of the linear regulator).

According to one aspect, provision is made in this respect of a voltage regulator, for example produced in an integrated manner in particular within an integrated circuit, including a pre-regulation circuit configured to generate a first power supply voltage from a voltage source, a low drop-out voltage regulator configured to generate a second power supply voltage from the first power supply voltage, and configured to filter a low-frequency component from the first power supply voltage.

The pre-regulation circuit represents the main source of noise within the voltage regulator since it typically produces a low-frequency component.

The low-frequency component of the noise on the first power supply voltage is thus attenuated, or even eliminated, by designing the linear regulator with a bandwidth adapted to filter low-frequency noise. Provision is therefore made of a linear regulator allowing to ensure the regulation from the first power supply voltage and at the same time to act as a high-pass filter on its input, in a way specifically adapted to the frequencies of the low-frequency component of said noise.

The voltage regulator may advantageously further comprise a low-pass filter circuit configured to filter a high-frequency component of the first power supply voltage.

The pre-regulation circuit typically also produces a high-frequency component which can be determined according to parameters of the pre-regulation circuit. The low-pass filter circuit is thus designed to attenuate, or even eliminate, the high-frequency component of the noise on the first power supply voltage.

Thus, the elimination of the high-frequency component and the low-frequency component of the first power supply voltage allows to attenuate or even cancel the noise at the output of the low drop-out voltage regulator, that is to say attenuate or even cancel the noise in the second power supply voltage.

Consequently, the voltage regulator allows to provide a regulated power supply voltage (the second power supply voltage) with extremely low noise, and furthermore according to an advantageous or even optimal energy efficiency.

According to one embodiment, the low drop-out voltage regulator comprises a transistor configured to generate the second power supply voltage under the control of a control voltage adapted to regulate the level of the second power supply voltage to a reference level, wherein the pre-regulation circuit is configured to generate the first power supply voltage at an adapted level, depending on the reference level, to place said transistor in a linear regime.

In linear regime, the transistor is advantageously capable of regulating the level of the second power supply voltage substantially proportional to the control voltage.

According to one embodiment, the pre-regulation circuit comprises a switched-mode power supply configured to generate the first power supply voltage at a level higher than the reference level, by a difference adapted to exceed a saturation voltage of the transistor.

The saturation voltage is for example the minimum voltage between the collector and the emitter of a bipolar transistor, beyond which the transistor is in linear regime. The potential difference between the first power supply voltage and the second power supply voltage is thus advantageously defined to be greater than the saturation voltage of the transistor.

Advantageously, this potential difference can be maintained at a level placing the transistor in the linear regime but close to the limit of the saturated regime, in order to benefit from optimal performance of the low drop-out voltage regulator.

According to one embodiment, said switched-mode power supply includes a negative feedback loop transmitting a negative feedback signal to regulate the first power supply voltage, an offset generator circuit being configured to lower the voltage of the negative feedback signal by an offset from the reference level and an additional margin, so that the switched-mode power supply regulates the first power supply voltage to said reference level and the additional margin.

The regulation of the first power supply voltage to the reference level and the additional margin can be achieved easily by configuring the switched-mode power supply with a negative feedback loop. The switched-mode power supply in this configuration thus allows to provide the low drop-out voltage regulator with a first power supply voltage whose voltage value is sufficiently close to that of the drop-out voltage of the linear regulator (that is to say the transistor saturation voltage) to limit the heat dissipation of this regulator but high enough to maintain this regulator in its linear regime.

On the other hand, it is advantageously proposed in this embodiment to position the first power supply voltage at said reference level added by said margin, by means of an offset of the opposite sign, introduced on the feedback signal.

According to one embodiment, the switched-mode power supply comprises switching means configured to operate at a forced switching frequency, the low-pass filter circuit being configured to have a cut-off frequency lower than the forced switching frequency.

Indeed, it can be considered that the switching frequency corresponds to the frequency of the high-frequency component of the noise on the first power supply voltage, which can be precisely filtered with respect to the cut-off frequency of the low-pass filter, by forcing the switching means to operate at a switching frequency predetermined therefor.

Consequently, the low-pass filter circuit can be dimensioned according to the predetermined switching frequency so as to eliminate, effectively and in a controlled manner, the high-frequency component of the noise on the first power supply voltage.

According to one embodiment, the cut-off frequency is lower than the forced switching frequency by a factor of at least 100.

According to another aspect, a regulation method is proposed comprising generating a first power supply voltage from a voltage source and generating a second power supply voltage by a low drop-out voltage regulator from the first power supply voltage, the method further comprising filtering a low-frequency component of the first power supply voltage by the low drop-out voltage regulator.

The method can advantageously further comprise filtering a high-frequency component of the first power supply voltage.

According to one implementation, the second power supply voltage is generated by a transistor controlled by a control voltage adapted to regulate the level of the second power supply voltage to a reference level, and wherein the first power supply voltage is generated at an adapted level, depending on the reference level, to place said transistor in a linear regime.

According to one implementation, the first power supply voltage is generated by a switched-mode power supply at a level higher than the reference level, by a difference adapted to exceed a saturation voltage of the transistor.

According to one implementation, the method comprises a transmission of a negative feedback signal by a negative feedback loop of said switched-mode power supply to regulate the first power supply voltage and a lowering of the voltage of the negative feedback signal by an offset from the reference level and an additional margin, such that the switched-mode power supply regulates the first power supply voltage to said reference level and the additional margin.

According to one implementation, the first power supply voltage is generated by the switched-mode power supply operating in switching mode at a forced switching frequency, and the filtering of the high-frequency component is carried out at a cut-off frequency lower than the forced switching frequency.

According to one implementation, the cut-off frequency is lower than the forced switching frequency by a factor of at least 100.

FIG. 1 illustrates a voltage regulator REG according to at least one embodiment. The voltage regulator REG comprises a low drop-out voltage regulator 1. The voltage regulator REG is in particular intended to be produced in an integrated manner, usually within an integrated circuit IC.

The low drop-out voltage regulator 1 is a linear regulator with very low noise and high power supply rejection ratio over a low and mid frequency range. The power supply rejection ratio (known as PSRR) of the low drop-out voltage regulator 1 is the ability of the low drop-out voltage regulator 1 to attenuate or block said low and medium frequencies from its input 12. This (the "PSRR") can be considered to correspond to an intrinsic high-pass filter effect of the low drop-out voltage regulator 1.

For example, the high power supply rejection ratio is comprised between 60 dB and 90 dB, and the low and mid frequency range is comprised between 1 Hz and 100 kHz.

The low drop-out voltage regulator 1 comprises a transistor 10 controlled in closed loop with an amplifier 11. The transistor 10 is advantageously a bipolar transistor, for example an NPN type transistor, and the amplifier 11 is a low noise operational amplifier.

The collector of the transistor 10 is coupled to an input terminal 12 of the low drop-out voltage regulator 1 and the emitter of the transistor 10 is coupled to an output terminal 13 of the low drop-out voltage regulator 1. The amplifier 11 has an inverting "−" input coupled to the output terminal 13, a non-inverting "+" input coupled to a reference voltage node 15, and an output coupled to a control terminal of the transistor 10. A programmable voltage generator 5 is configured to generate a reference voltage at a reference level VOUT_REF, in particular on the reference voltage node 15. The value of the reference level VOUT_REF can for example be defined and controlled by a user.

In other words, the transistor 10 is configured to generate the second power supply voltage VOUT under the control of a control voltage Vcom. The control voltage Vcom is generated by the amplifier 11 on the control terminal of the transistor 10 (that is to say the base terminal) and is adapted to regulate the level of the second power supply voltage VOUT to the reference level VOUT_REF.

The voltage regulator REG in this example further comprises a pre-regulation circuit 3 and a low-pass filter circuit 2. The pre-regulation circuit 3 has an output 311 coupled to the input 23 of the low-pass filter circuit 2, and the low-pass filter circuit 2 has an output 24 coupled to the input terminal 12 of the low drop-out voltage regulator 1.

That being said, the low-pass filter circuit 2 is optional, and, in an alternative, the output 311 of the pre-regulation circuit 3 can be directly coupled to the input terminal 12 of the low drop-out regulator 1.

The pre-regulation circuit 3 comprises a switched-mode power supply 31. The switched-mode power supply 31 is a step-down voltage type regulator configured to generate a first power supply voltage Vo from a supply source VIN. The power supply source VIN is for example an unregulated voltage source such as for example a portable product battery or a mains type power supply.

The first power supply voltage Vo generated by this type of switched-mode power supply 31 typically includes parasitic noise components such as a high-frequency noise component Vhf corresponding for example to the switched-mode frequency of the switched-mode power supply 31 and a low-frequency noise components Vbf corresponding for example to the negative feedback loop regulation noise Vfb.

Thus, the low-pass filter 2, receiving the first power supply voltage Vo, allows to reject the high-frequency parasitic component Vhf of the noise. The filtered voltage Vo-filt, at the output 24 of the filter 2, is thus transmitted to the low drop-out voltage regulator 1.

The low drop-out voltage regulator 1, receiving the filtered voltage Vo-filt, allows on the one hand to generate a second power supply voltage VOUT from the filtered voltage Vo-filt, and on the other hand allows to reject the low-frequency parasitic component Vbf of the noise not filtered by the low-pass filter 2. In particular, the transistor 10 and the amplifier 11 are designed to attenuate, or even eliminate the low-frequency component Vbf of the noise at the input 12 of the low drop-out voltage regulator 1.

In the alternative where the regulator REG does not include the low-pass filter 2, the low drop-out voltage regulator 1 receives the first power supply voltage Vo generated at the output 311 of the pre-regulation circuit 3. Thus, the low drop-out voltage regulator 1 allows on the one hand to generate the second power supply voltage VOUT from the first power supply voltage Vo, and on the other hand allows to reject the low-frequency parasitic component Vbf of the first power supply voltage Vo.

The output terminal 13 of the low drop-out voltage regulator 1 can be used to power supply a load of a peripheral (not shown) with the second regulated power supply voltage VOUT which is constant and having extremely low noise.

In other words, the step-down voltage type regulator REG, has high energy efficiency and very low noise, and in this respect comprises the pre-regulation circuit 3, the low drop-out voltage regulator 1 and the low-pass filter circuit 2.

On the one hand, the pre-regulation circuit 3 is configured to generate the first power supply voltage Vo from a power supply source VIN and the low drop-out voltage regulator 1 is configured to generate a second power supply voltage VOUT from the first power supply voltage Vo.

On the other hand, the low-pass filter circuit 2 is configured to filter the high-frequency component Vhf of the first power supply voltage Vo, while the low drop-out voltage regulator 1 is configured to filter the low-frequency component Vbf of the first power supply voltage Vo.

The pre-regulation circuit 3 can represent the main source of noise within the voltage regulator REG, typically producing the high-frequency component Vhf which can be determined according to parameters of the pre-regulation circuit 3. The low-pass filter circuit 2 is in this respect specifically designed to attenuate, or even eliminate, the high-frequency component Vhf of the noise on the first power supply voltage Vo.

The high-frequency component Vhf coming from the pre-regulation circuit 3 as described previously can have a constant and known frequency, in particular if the switched-mode power supply 31 is controlled in a forced pulse-width modulation mode.

The low-frequency component Vbf of the noise on the first power supply voltage Vo can also be mainly generated by the pre-regulation circuit 3. The low-frequency component Vbf is itself attenuated, or even entirely eliminated, by designing the low drop-out voltage regulator 1 with an adapted bandwidth for filtering the low-frequency noise Vbf.

The linear regulator 1 is thus advantageously configured to both provide regulation from the first power supply voltage Vo and at the same time act as a high-pass filter on its input 12, in a manner specifically adapted to the frequencies of the low-frequency component Vbf of the noise.

Thus, the filtering of the high-frequency component Vhf and of the low-frequency component Vbf of the first power supply voltage Vo allows to attenuate or even eliminate the noise at the output 13 of the low drop-out voltage regulator 1, that is to say in the second power supply voltage VOUT.

Consequently, the voltage regulator REG according to this aspect allows to provide a power supply voltage which is regulated (the second power supply voltage VOUT) and without noise (or at least at extremely low noise), and furthermore according to an optimal energy efficiency, (or at least very advantageous).

For example, the low-pass filter circuit 2 is a second-order low-pass filter allowing to filter the high-frequency component Vhf with an attenuation equal to 40 dB per decade over a range of frequencies greater than or equal to the cut-off frequency Fc of the low-pass filter 2. The low-pass filter 2 is composed for example of a first inductive element 21 and of a first capacitive element 22.

The inductive elements and the capacitive elements of the low-pass filter circuit 2 can be dimensioned so that the cut-off frequency Fc of the low-pass filter circuit 2 is at least lower than the switched-mode frequency of the regulator 31 by a factor 100; for example the cut-off frequency Fc is 30 KHz if the switched-mode power supply 31 has a switched-mode frequency Fpwm equal to 3 MHz in order to reduce the high-frequency component Vhf by approximately 80 dB between the output 24 and the input 23 of the low-pass filter.

The person skilled in the art will be able to dimension the inductive values of the first inductive element 21 and the capacitive values of the first capacitive element 22 of the low-pass filter 2 according to the desired cut-off frequency Fc.

Moreover, switched-mode power supply 31 includes at least one switch (which may be referred to herein as switching means) (not shown) and its intrinsic filter circuit 32 composed of a second inductive element L and a second capacitive element Cout1. The at least one switch may include any switching devices suitable to operate at a forced switching frequency Fpwm to facilitate converting the voltage VIN of the power supply source into the first power supply voltage Vo.

The switching means are configured to operate at a forced switching frequency Fpwm and allow to convert the voltage VIN of the power supply source into the first power supply voltage Vo, filtered by the filter circuit 32, of which the person skilled in the art will be able to dimension the inductive value of the second inductive element L and the capacitive value of the second capacitive element Cout1 of the filter circuit 32.

The forced switching frequency Fpwm can be obtained by generating a pulse width modulation signal allowing to control an opening and closing of the switching means at a frequency which is constant or close to be constant and whose pulse width allows to vary the first power supply voltage Vo. The forced switching frequency Fpwm must be as high as possible but is limited by the switching energy losses of the switched-mode power supply 31. For example, the forced switching frequency Fpwm is comprised between 1 MHz and 3 MHz.

The operation of the switched-mode power supply 31, in particular of the switching means, generates a high-frequency noise corresponding to the high-frequency component Vhf of the first power supply voltage Vo and stabilises the frequency of the high-frequency component at the forced switching frequency Fpwm. In particular, the cut-off frequency Fc of the low-pass filter circuit 2 is lower than the forced switching frequency Fpwm.

Indeed, it can be considered that the switching frequency Fpwm corresponds to the frequency of the high-frequency component Vhf of the noise on the first power supply voltage Vo, which can be precisely filtered with respect to a cut-off frequency Fc of the low-pass filter circuit 2. Indeed, if the frequency of the high-frequency component Vhf is substantially constant, then the low-pass filter circuit 2 can advantageously have a constant and controlled behaviour and effect on the high-frequency component Vhf.

Consequently, the low-pass filter circuit 2 can be dimensioned according to the predetermined switching frequency Fpwm so as to eliminate, effectively and in a controlled manner, the high-frequency component Vhf of the noise on the first power supply voltage Vo.

Advantageously, the cut-off frequency Fc is lower than the forced switching frequency Fpwm by a factor of at least 100. In other words, the low-pass filter circuit 2 can be designed based on the forced switching frequency Fpwm corresponding to a frequency of the pulse width modulated signal controlled and maintained at a known value. For example, the cut-off frequency Fc is equal to 30 KHz for a switching frequency Fpwm of 3 MHz.

The pre-regulation circuit 3 further comprises a voltage divider bridge 33 coupled to the output 311 of the switched-mode power supply 31. The voltage divider bridge 33 comprises a first resistive element Ro and a second resistive element Rg. The first resistive element Ro and the second resistive element Rg of the divider bridge 33 are configured to provide a voltage representative of the first power supply voltage Vo at a level adapted for the negative feedback loop 4 of the switched-mode power supply 31.

The switched-mode power supply 31 comprises a negative feedback loop 4 coupled to the voltage divider bridge 33 and to an input FB of the switched-mode power supply 31, and comprises an offset generator circuit 41.

The negative feedback loop 4 transmits a voltage feedback signal Vfb to the switched-mode power supply 31 to regulate the first power supply voltage Vo, typically in order to compensate for a drift in the first power supply voltage Vo and to maintain its constant level.

Advantageously, the level of the first power supply voltage Vo is equal to the sum of the reference level VOUT_REF and an additional margin Voffset. The additional margin Voffset is a static voltage generated by the offset generator circuit 41 to compensate for the DC voltage drop between the first power supply voltage Vo and the second power supply voltage VOUT.

In particular, the negative feedback loop 4 can generate low-frequency noise on the first power supply voltage Vo, thus producing the low-frequency component Vbf during the regulation of the first power supply voltage Vo by the switched-mode power supply 31.

In other words, the offset generator circuit 41 is configured to lower the voltage Vfb of the feedback signal by an offset from the reference level VOUT_REF and an additional margin Voffset, so that the switched-mode power supply 31 regulates the first power supply voltage Vo to the reference level VOUT_REF and the additional margin Voffset.

The regulation of the first power supply voltage Vo at the reference level VOUT_REF and the additional margin Voffset thus allows to provide the low drop-out voltage regulator 1 with a first power supply voltage Vo whose voltage value is sufficiently close to the drop-out voltage Vldo of the low drop-out voltage regulator 1 to limit the heat dissipation from the low drop-out voltage regulator 1 but high enough to keep the low drop-out voltage regulator 1 in its linear regime or region.

It is for example possible to define the additional margin Voffset as follows: Voffset=Vfilt+Vldo+Vmargin with Vfilt being the voltage drop produced by the low-pass filter circuit 2, Vldo being the voltage drop produced by the regulator at low drop-out voltage 1 and Vmargin being another estimated margin voltage to ensure that the low drop-out voltage regulator 1 operates in a linear regime regardless of the peak-to-peak noise on the voltage Vfilt.

In the previously mentioned alternative where the voltage regulator REG does not comprise a low-pass filter 2, the additional margin Voffset can be defined as follows: Voffset=Vldo+Vmargin with the predefined margin voltage Vmargin to ensure that the low drop-out voltage regulator 1 operates in a linear regime.

The drop-out voltage Vldo of the low drop-out voltage regulator 1, which corresponds to the saturation voltage Vsat of the transistor 10, is the minimum power supply voltage allowing the transistor 10 to operate in its linear regime, that is to say so that it can regulate the second power supply voltage VOUT at a constant level and with extremely low noise. Indeed, the low-frequency component Vbf of the signal Vo-filt risks being transmitted at the output 13 of the low drop-out voltage regulator 1, in the second power supply voltage VOUT, if the transistor 10 does not operate in the linear regime.

The level of the first power supply voltage Vo is high enough to ensure that the linear regulator 1 is power supplied just above its drop-out voltage Vldo and therefore that the transistor 10 operates in a linear regime, automatically regardless of the conditions, due to the use of the common reference voltage VOUT_REF. In the case of a bipolar transistor, the voltage between the collector and the emitter of the transistor 10, equal to the difference between the filtered voltage Vo-filt and the second power supply voltage VOUT (or the difference between the first power supply voltage Vo and the second power supply voltage VOUT in the case of the alternative presented above), is defined to be greater in absolute value than the saturation voltage Vsat (usually designated "VCEsat" in the case of a bipolar transistor) which is usually comprised between 0.1V and 0.5V.

Furthermore, the difference between the first power supply voltage Vo, regulated at the reference level VOUT_REF and the additional margin Voffset, and the second power supply voltage VOUT, regulated at the reference level VOUT_REF, allows to avoid operation of the transistor in a saturated regime. Indeed, the regulation of the second power supply voltage VOUT is degraded if the transistor 10 goes into saturation. Advantageously, the difference between the first power supply voltage Vo and the second power supply voltage VOUT can be maintained at a level close to the limit of the saturated regime, in order to benefit from optimal performance of the low drop-out voltage regulator 1.

As an indication, the voltage source VIN power supplies the pre-regulation circuit 3 with a voltage of 5V and a second power supply voltage VOUT equal to 1V power supplies the load of a peripheral consuming a current of 1 A. Assuming that the voltage drop Vldo-dc of the low drop-out voltage regulator 1 is 150 mV (which amounts to a power loss of 150 mW), that the voltage drop Vfilt-dc of the low-pass filter circuit is 50 mV (which amounts to an energy loss of 50 mW), that the additional margin Voffset is 50 mV and that the pre-regulation circuit 3 has an energy efficiency of the order of 90% (which amounts to an energy loss of 133 mW), then the energy losses of the complete circuit are of the order of 333 mW; that is to say an energy efficiency of around 75%.

This order of magnitude of the energy losses allows in particular to use a simple and compact cooling system, or even not to require a cooling system.

By way of comparison, a conventional circuit having similar specifications and features, but using only a low drop-out voltage regulator 1 in isolation instead of the voltage regulator REG, has energy losses of the order of 4 W; that is to say an energy efficiency of around 20% typically requiring the use of an efficient and usually very bulky cooling system.

FIG. 2 illustrates an example of a method for regulating the second power supply voltage VOUT by a voltage regulator REG as described previously in relation to FIG. 1.

The method comprises a step 100 of generating the first power supply voltage Vo from the voltage source VIN. For example, the voltage VIN is converted by the switching means of the switched-mode power supply 31 into the first power supply voltage Vo.

The method can for example comprise a step 101 of transmitting the negative feedback signal of voltage Vfb to the switched-mode power supply 31, to regulate the first power supply voltage Vo. The voltage Vfb of the negative feedback signal is generated based on the voltage Vdiv corresponding to the first power supply voltage Vo and to the reference level VOUT_REF.

In particular, the first power supply voltage Vo is advantageously generated at a level higher than the reference level VOUT_REF by a difference adapted to exceed the saturation voltage Vsat of the transistor 10.

The method can comprise in this respect a step 102 of lowering the voltage Vfb of the negative feedback signal by a level corresponding to the offset of the reference level VOUT_REF and the additional margin Voffset, so that the switched-mode power supply 31 regulates the first power supply voltage Vo to the reference level VOUT_REF and the additional margin Voffset.

The method can for example comprise a step 103 of generating the first power supply voltage Vo by the switched-mode power supply 31 wherein the switching means operate at a forced switching frequency Fpwm.

The method optionally comprises a step 104 of filtering the high-frequency component Vhf of the first power supply voltage Vo. The filtering allows the generation and transmission of a very low noise power supply voltage Vo-filt to the low drop-out voltage regulator 1.

In step 104, the filtering of the high-frequency component Vhf is performed at a cut-off frequency Fc lower than the switching frequency Fpwm. The high-frequency component Vhf can thus be stabilised by controlling the switching means of the switched-mode power supply 31 by a signal forcing a pulse-width modulation. The switching means thus operate at a forced switching frequency Fpwm, advantageously higher than the cut-off frequency Fc of the low-pass filter circuit 2.

The method comprises a step 200 of filtering the low-frequency component Vbf. In particular, the filtering is carried out on the input 12 of the low drop-out voltage regulator 1, for example advantageously in a manner specifically adapted to the frequencies of the low-frequency component Vbf of said noise.

The method finally comprises a step 201 of generating the second power supply voltage VOUT which is constant and very low noise, from the first power supply voltage Vo. The generation of the second power supply voltage VOUT can for example be used to power supply the load of a peripheral to the second power supply voltage VOUT.

The step 201 of generating the second power supply voltage VOUT comprises in practice a regulation 202 of the second power supply voltage VOUT to a reference level VOUT_REF. More particularly, the generation of the second power supply voltage VOUT comprises the control of the transistor 10 by a control signal Vcom adapted to regulate the level of the second power supply voltage VOUT to the reference level VOUT_REF.

What is claimed is:

1. A voltage regulator, comprising:
a pre-regulation circuit comprising a switched-mode power supply, the pre-regulation circuit configured to generate a first power supply voltage based on an input voltage; and
a low drop-out voltage regulator comprising a transistor, the low drop-out voltage regulator configured to:
generate, by the transistor, a second power supply voltage based on the first power supply voltage and a control voltage, the control voltage regulating the second power supply voltage to a reference level, and
filter a low-frequency component of the first power supply voltage,
wherein the pre-regulation circuit generates the first power supply voltage to a first level that exceeds a saturation voltage of the transistor.

2. The voltage regulator according to claim 1, further comprising a low-pass filter circuit configured to filter a high-frequency component of the first power supply voltage.

3. The voltage regulator according to claim 2, wherein the switched-mode power supply comprises at least one switch configured to operate at a forced switching frequency, the low-pass filter circuit being configured to have a cut-off frequency lower than the forced switching frequency.

4. The voltage regulator according to claim 3, wherein the cut-off frequency is lower than the forced switching frequency by a factor of at least 100.

5. The voltage regulator according to claim 1, wherein the pre-regulation circuit is configured to generate the first power supply voltage at a second level, based on the reference level, to operate the transistor in a linear region.

6. The voltage regulator according to claim 1, wherein the switched-mode power supply includes a negative feedback loop configured to regulate the first power supply voltage by generating a negative feedback signal, an offset generator circuit configured to lower a voltage of the negative feedback signal by an offset from the reference level and an additional margin, the switched-mode power supply configured to regulate the first power supply voltage to the reference level and the additional margin.

7. An integrated circuit, comprising:
a voltage regulator, the voltage regulator including:
a pre-regulation circuit comprising a switched-mode power supply, the pre-regulation circuit configured to receive an input voltage and to generate a first power supply voltage based on the input voltage; and
a low drop-out voltage regulator comprising a transistor, the low drop-out voltage regulator configured to generate a second power supply voltage by filtering a low-frequency component of the first power supply voltage, the second power supply voltage generated based on the first power supply voltage and a control voltage, the control voltage regulating the second power supply voltage to a reference voltage,
wherein the pre-regulation circuit generates the first power supply voltage to a first level that exceeds a saturation voltage of the transistor.

8. The integrated circuit according to claim 7, further comprising a low-pass filter coupled between the pre-regulation circuit and the low drop-out voltage regulator, the low-pass filter configured to generate a filtered voltage by filtering a high-frequency component of the first power supply voltage.

9. The integrated circuit according to claim 8, wherein the transistor includes a control terminal, a first terminal, and a second terminal, the control terminal configured to receive the control voltage, the first terminal configured to receive the filtered voltage, and the second terminal configured to output the second power supply voltage based on the control voltage.

10. The integrated circuit according to claim 9, wherein the low drop-out voltage regulator comprises an operational amplifier having an inverting input coupled to the second terminal of the transistor, a non-inverting input coupled to the reference voltage, and an output coupled to the control terminal of the transistor, the operational amplifier configured to output the control voltage.

11. The integrated circuit according to claim 10, wherein the pre-regulation circuit is configured to generate the first power supply voltage based on the reference voltage.

12. The integrated circuit according to claim 8, wherein the switched-mode power supply comprises a switch configured to operate at a forced switching frequency, the low-pass filter configured to have a cut-off frequency lower than the forced switching frequency.

13. The integrated circuit according to claim 7, wherein generating the first power supply voltage comprises generating the first power supply voltage, based on the reference voltage, to a second level that operates the transistor in a linear region.

14. The integrated circuit according to claim 7, wherein the switched-mode power supply includes a negative feedback loop configured to regulate the first power supply voltage by generating a negative feedback signal, an offset generator circuit configured to lower a voltage of the negative feedback signal by an offset from the reference voltage and an additional margin, the switched-mode power supply configured to regulate the first power supply voltage to the reference voltage and the additional margin.

15. A method, comprising:
generating, by a pre-regulation circuit, a first power supply voltage based on an input voltage received from a voltage source;
generating, by a low drop-out regulator, a second power supply voltage, based on the first power supply voltage, by filtering a low-frequency component of the first power supply voltage; and
generating a control voltage by the low drop-out regulator, wherein generating the second power supply voltage includes controlling a transistor of the low drop-out regulator, based on the control voltage, to regulate the second power supply voltage to a reference level,
wherein generating the first power supply voltage includes generating the first power supply voltage by a switched-mode power supply at a first level greater than the reference level to exceed a saturation voltage of the transistor.

16. The method according to claim 15, wherein generating the second power supply voltage includes filtering a high-frequency component of the first power supply voltage.

17. The method according to claim 15, wherein generating the first power supply voltage includes generating the first power supply voltage, based on the reference level, to a second level that operates the transistor in a linear region.

18. The method according to claim 15, comprising:
generating a negative feedback signal by a negative feedback loop of the switched-mode power supply; and regulating the first power supply voltage to the reference level and an additional margin by reducing a level of a voltage of the negative feedback signal by an offset from the reference level and the additional margin.

19. The method according to claim 15, wherein generating the first power supply voltage includes:

operating the switched-mode power supply in switching mode at a forced switching frequency; and filtering a high-frequency component of the first power supply voltage at a cut-off frequency lower than the forced switching frequency.

20. The method according to claim 19, wherein the cut-off frequency is lower than the forced switching frequency by a factor of at least 100.

\* \* \* \* \*